United States Patent
Hichri et al.

(12) 
(10) Patent No.: US 6,258,910 B1
(45) Date of Patent: Jul. 10, 2001

(54) POLYMERIZING VINYL CHLORIDE IN CARBON DIOXIDE

(75) Inventors: Habib Hichri; Ramesh Krishnamurti, both of Williamsville; Thomas Smolka, West Senaca, all of NY (US)

(73) Assignee: Occidental Chemical Corporation, Dallas, TX (US)

( * ) Notice: Subject to any disclaimer, the term of this patent is extended or adjusted under 35 U.S.C. 154(b) by 0 days.

(21) Appl. No.: 09/328,525

(22) Filed: Jun. 9, 1999

(51) Int. Cl.[7] .................. C08F 114/06; C08F 114/08; C08G 67/02
(52) U.S. Cl. .................. 526/343; 526/88; 526/89; 526/227; 526/229; 526/230.5; 526/291; 526/292.7; 526/318.27; 526/344; 526/344.1; 528/392; 528/397; 522/5; 522/6; 522/60; 504/442; 504/457
(58) Field of Search ............... 526/88, 89, 227, 526/229, 230.5, 291, 292.7, 318.25, 343, 344, 344.1; 528/392, 397; 522/5, 6, 60; 524/442, 457

(56) References Cited

U.S. PATENT DOCUMENTS 5,312,882   5/1994   DeSimone et al. ............ 526/201
5,527,865   6/1996   DeSimone et al. ............ 526/89

FOREIGN PATENT DOCUMENTS

WO9828351   7/1998   (WO).

*Primary Examiner*—Samuel A. Acquah
(74) *Attorney, Agent, or Firm*—Richard D. Fuerle; Anne E. Brookes

(57) ABSTRACT

Disclosed is a method of polymerizing vinyl chloride or vinylidene chloride monomer. A mixture is prepared of (1) a monomer selected from the group consisting of vinyl chloride, vinylidene chloride, and mixtures thereof with up to about 20 wt % of a comonomer, (2) supercritical carbon dioxide, subcritical carbon dioxide, or liquid carbon dioxide in a weight ratio to the monomer of about 0.5 to about 5; and (3) about 0.1 to about 1 phr of a free radical initiator that is soluble in said supercritical carbon dioxide or a solution of said a free radical initiator in a solvent that is miscible with the carbon dioxide.

The mixture is heated to a temperature of about 40 to about 70° C. to polymerize the monomer.

21 Claims, No Drawings

POLYMERIZING VINYL CHLORIDE IN CARBON DIOXIDE

BACKGROUND OF THE INVENTION

This invention relates to a method of polymerizing vinyl chloride and vinylidene chloride. In particular, it relates to the use of supercritical, subcritical, or liquid carbon dioxide as a solvent in which vinyl chloride or vinylidene chloride is polymerized.

Polyvinylchloride (PVC) is made by polymerizing vinyl chloride monomer (VCM) in an aqueous suspension, an aqueous dispersion, or bulk (i.e., without a solvent). While these processes are effective, there are some problems associated with them. For example, in the suspension and dispersion processes energy is needed to evaporate solvent. In all three processes, unreacted VCM must be removed from the PVC because it is a carcinogen, and its removal to acceptable levels is difficult. Also, those processes are subject to reactor fouling and the formation of fish eyes in the PVC.

SUMMARY OF THE INVENTION

We have discovered that VCM and vinylidene chloride will polymerize in supercritical, subcritical, or liquid $CO_2$. We have found that VCM is soluble in that $CO_2$, but that PVC is not soluble in it. Thus, as the PVC forms, it separates from the VCM.

Surprisingly, PVC made according to this invention is more porous than PVC made by other methods. As a result, it is easier to remove unreacted VCM from the PVC.

We have found that there is a relationship between the density (i.e., pressure) of the $CO_2$ and the molecular weight of the PVC in that higher molecular weight PVC is made when the density of the $CO_2$ increases. We also found an inverse relationship between the ratio of $CO_2$ to VCM and the molecular weight of the PVC. That is, if that ratio is higher, the molecular weight of the PVC is lower.

The use of $CO_2$ offers several advantages over other methods of making PVC. There is less reactor fouling and fewer fish eyes occur when $CO_2$ is used as the solvent. Little or no energy is required to evaporate the solvent because the $CO_2$ evaporates at room temperature. $CO_2$ is inexpensive, non-toxic, non-flammable, relatively environmentally innocuous, and can be easily recycled. If it is recycled, removal of unreacted VCM from it is not necessary.

DESCRIPTION OF THE PREFERRED EMBODIMENTS

The process of the invention can be used to polymerize VCM or vinylidene chloride. The polymerization of VCM is preferred as it is commercially more important. Up to about 20 wt % (based on total monomer weight) of a comonomer, such as vinyl acetate, methylacrylate, methyl methacrylate, acrylonitrile, vinyl ether, vinyl fluoride, or vinylidene fluoride can be copolymerized with the VCM or vinylidene chloride. Vinylidene chloride can be a comonomer for VCM and vice versa.

Supercritical carbon dioxide is $CO_2$ at a temperature and pressure above its critical point. That is, its temperature is higher than 31° C. and its pressure is greater than 1066 psi (73.8 atm or 7.3 MPa). Subcritical carbon dioxide is $CO_2$ at a temperature above 31° C. and a pressure below 7.3 MPa. Liquid carbon dioxide is $CO_2$ at a temperature between −55 and 31° C. that is under sufficient pressure to be a liquid. The amount of $CO_2$ used (by weight) should be about 0.5 to about 5 times the amount of monomer. Less may result in reduced porosity and the presence of fish eyes and more may reduce throughput and lower the molecular weight of the product. Preferably, the amount of $CO_2$ is about 0.8 to about 1.2 times the amount of monomer. The $CO_2$ can be placed in the reactor as a solid (dry ice) or as a gas, as long as it is converted into supercritical, subcritical, or liquid $CO_2$ for the polymerization of the VCM or vinylidene chloride.

The polymerization requires a free radical initiator. In order to have a good reaction, the initiator must be soluble in the $CO_2$ or in a solvent that is miscible with the $CO_2$. Suitable initiators include organic compounds containing a peroxy (—OO—) group, such as diacyl peroxides (R—CO—OO—CO—R), percarbonates (RO—CO—OO—CO—OR'), and peresters (R—CO—OO—CO—OR'). Examples include diacetyl peroxide, dibenzoyl peroxide, diethyl peroxydicarbonate, di-n-propyl peroxydicarbonate, di-sec-butyl peroxydicarbonate, t-butyl peroxydicarbonate, di-2-ethylhexyl peroxydicarbonate, and t-amyl peroxypivalate. The preferred initiators are di-n-propyl peroxydicarbonate and diethyl peroxydicarbonate as they have been found to work well. The amount of initiator used should be about 0.1 to about 1 phr (parts by weight per 100 parts by weight of monomer) as less is ineffective and more is unnecessary. Preferably, the amount of initiator is about 0.3 to about 0.9 phr.

If the initiator does not dissolve in the $CO_2$, it should be dissolved in a solvent that is miscible with the $CO_2$. Depending upon the particular initiator, suitable solvents can include toluene, alcohols such as methanol, ethanol, isopropanol, and hexanol, or hydrocarbons such as pentane, hexane, cyclohexane, and heptane. Partially fluorinated and perfluorinated solvents, such as 2,2,2-trifluoroethanol, α,α, α-trifluorotoluene, hexafluorobenzene, and perfluoroalkanes are also expected to be useful due to their high solubility in $CO_2$. The preferred solvents are ethanol and toluene because they are inexpensive, readily available, and easily dissolve most initiators. The amount of solvent used should be sufficient to dissolve the initiator; excess solvent should be avoided because it provides no additional benefit and presents additional processing costs.

A support is preferably used to disperse the initiator as supported initiators produce a less agglomerated product. The support can be in addition to the solvent or as an alternative to the solvent. Examples of suitable supports include amorphous or fumed silica or alumina and other metal oxides, such as titania, and silica gel. The amount of support used should be about 0.12 to about 0.6 g/g of initiator; the preferred amount of support is about 0.2 to about 0.4 g/g of initiator.

The polymerization can be performed either as a batch or as a continuous process. In a batch process, the reactor can be cooled to less than −10° C. to prevent the premature polymerization of the monomer. The reactor is charged with the monomer, which liquefies in the reactor, or liquid monomer can be used. The initiator is injected into the reactor followed by the $CO_2$ while stirring. The reaction mixture is heated to the reaction temperature, about 40 to about 70° C., and preferably about 45 to about 65° C. Lower temperatures require an initiator having a lower half life temperature, which is hard to handle, and higher temperatures may result in side reactions and inferior products. The polymerization reaction can be followed by observing the reactor pressure or by gas chromatography (GC). Typically, it requires about 2 to about 5 hours to achieve about 80% monomer conversion. The polymerization can be performed as a continuous process by charging the monomer, initiator, and $CO_2$ as liquids. The product is submicron-sized highly porous particles.

The following examples further illustrate this invention:

EXAMPLES 1 to 4

In these experiments, the reactor was a high pressure 300 cc "Monel" autoclave equipped with a controlled stirring system, internal water cooling coil, temperature controller, heating mantle, and a pressure gauge. It had an length/diameter ratio of about 4. About 100 g of reagent grade VCM and various amounts of supercritical fluid grade carbon dioxide ($SC-CO_2$) were used. The reactor was cooled to −10° C. and charged with VCM, which liquefied in the reactor. To the reactor was added 0.7 ml of a 30 wt % solution of di-sec-butyl-peroxydicarbonate in mineral oil, sold by AtoChem as "Lupersol 225M-30." $SC-CO_2$ was added to the reactor at various $CO_2$/VCM ratios. The polymerizations were performed at 50° C. at a fixed stirring rate of 700 rpm. The following table gives the results:

| Example | $CO_2$/VCM wt ratio | Pressure (MPa) | Time (hours) | Molecular Weight | Yield (%) |
|---|---|---|---|---|---|
| 1 | 4 | 15.7 | 4 | 21284 | 8.2 |
| 2 | 3 | 10.2 | 4 | 26884 | 9.4 |
| 3 | 1.3 | 7.8 | 4 | 46686 | 68 |
| 4 | 1 | 6.1 | 4 | 62431 | 42 |

The above results show that the molecular weight increases as the pressure and the $CO_2$/VCM wt ratio decreases.

EXAMPLE 5

Example 4 was repeated at 65° C. and a reaction pressure of 7.3 MPa to investigate the effect of temperature because the effective temperature range of an initiator is very narrow. The molecular weight of the PVC was 57,540 and the yield (%) was ~29. Comparing this Example with Example 4 shows that the molecular weight falls if the reaction temperature is increased by 15° C.

EXAMPLES 6 to 8

Example 4 was repeated using different initiators at reaction temperatures that approximated the half-life temperatures of the initiators. The following table gives the results:

| Example | Initiator | Temperature (° C.) | Pressure (MPa) | Molecular Weight | Yield (%) |
|---|---|---|---|---|---|
| 6 | Luperox 10M-75[1] | 62 | 6.8 | 68,691 | 14 |
| 7* | Lupersol 221[2] | 50 | 8.2 | 164,581 | 44 |
| 8** | Lupersol 221[2] | 50 | 8.2 | 41,335 | 12.4 |

*$CO_2$/VCM wt ratio = 1.4
**$CO_2$/VCM wt ratio = 1.88 and reaction time = 2 hours
[1] A 75 wt % solution of t-butyl peroxyneodecanoate in mineral oil, sold by AtoChem.
[2] 100% pure di-n-propyl peroxydicarbonate, sold by AtoChem A comparison of Examples 4 and 6 to 8 show that, of the initiators tested, Example 7 using neat Lupersol 221 gave the highest molecular weight, perhaps due to improved solubility in $SC-CO_2$.

EXAMPLES 9 to 14

Example 8 was repeated using different solvents, supports, initiators, and conditions. In comparative Example 13, water was used as an additive. The following table gives the results:

| Ex. | Solvent/Additive | $CO_2$/VCM wt ratio | Pressure (MPa) | Molecular Weight | Yield (%) |
|---|---|---|---|---|---|
| 9 | none | 1.9 | 8.2 | 41,335 | 12.5 |
| 10 | none | 1.1 | 6.8 | 40,837 | 37 |
| 11 | 10 ml isopropyl alcohol (IPA) | 1.1 | 6.8 | 32,005 | 27.2 |
| 12 | 5 ml 5 wt % fumed silica (Cab-O-Sil M5) in IPA | 1.44 | 7.5 | 20,759 | 10.4 |
| 13 | 5 ml water | 1 | 6.3 | 51,016 | 46.6 |
| 14 | 0.15 ml mixture of 0.2 ml Lupersol 221 in 5 ml toluene | 1.03 | 23.1 | 55,648 | 25.4 |

Examples 12 and 14 gave PVC with good morphology.

EXAMPLE 15

Example 4 was repeated using solvent-less Lupersol 221 and 99.99% pure dry ice instead of liquid carbon dioxide. The ground dry ice was charged to the reactor and the reactor was sealed. A light vacuum was pulled on the reactor while it was cooled externally with dry ice/acetone to remove any air trapped in the reactor. The reaction was run for 2 hours at 50° C. and 5.0 MPa pressure. A white, powdery PVC was obtained. The yield was 45% and the molecular weight was 60,958.

We claim:

1. A method of making a polyvinylchloride or a polyvinylidene chloride comprising
    (A) preparing a water-free mixture of
        (1) a monomer selected from the group consisting of vinyl chloride, vinylidene chloride, and mixtures thereof with up to about 20 wt % of a comonomer;
        (2) supercritical carbon dioxide, or liquid carbon dioxide in a weight ratio to said monomer of about 0.5 to about 5; and
        (3) about 0.1 to about 1 phr of a free radical initiator that is soluble in said carbon dioxide or a solution of a free radical initiator in a solvent that is miscible with said carbon dioxide; and
    (B) heating said mixture to a temperature of about 40 to about 70° C.

2. A method according to claim 1 wherein said monomer is vinyl chloride.

3. A method according to claim 1 wherein said monomer is vinylidene chloride.

4. A method according to claim 1 wherein said free radical initiator is a peroxide, perester, or a percarbonate.

5. A method according to claim 4 wherein said free radical initiator is di-n-propyl peroxydicarbonate or diethyl peroxydicarbonate.

6. A method according to claim 4 wherein said carbon dioxide is added to said mixture as dry ice.

7. A method according to claim 1 wherein said free radical initiator is dissolved in an organic solvent.

8. A method according to claim 7 wherein said organic solvent is toluene.

9. A method according to claim 1 wherein said free radical initiator is on a support and the amount of said support is about 0.12 to about 0.6 g/g of said free radical initiator.

10. A method according to claim 9 wherein said support is amorphous or fumed silica or alumina.

11. A method according to claim 1 wherein said monomer is cooled below 0° C. before step (A).

12. A method according to claim 1 performed as a batch process.

13. A method according to claim 1 performed as a continuous process.

14. A method of polymerizing vinyl chloride monomer comprising, in the absence of water
   (A) mixing said vinyl chloride monomer with
      (1) supercritical carbon dioxide in a weight ratio of supercritical carbon dioxide to monomer of about 0.8 to about 1.2; and
      (2) about 0.3 to about 0.9 phr of a free radical initiator that is soluble in said supercritical carbon dioxide or a solution of said free radical initiator in a solvent that is miscible with said supercritical carbon dioxide; and
   (B) heating said mixture to a temperature of about 45 to about 65° C.

15. A method according to claim 14 wherein said free radical initiator is a peroxide, perester, or a percarbonate.

16. A method according to claim 14 wherein said free radical initiator is dissolved in an organic solvent.

17. A method according to claim 14 wherein said organic solvent is toluene.

18. A method of polymerizing vinyl chloride monomer comprising, in the absence of water
   (A) cooling said vinyl chloride monomer to a temperature below 0° C.;
   (B) mixing said cooled vinyl chloride monomer with
      (1) supercritical carbon dioxide in a weight ratio of supercritical carbon dioxide to said vinyl chloride monomer of about 0.8 to about 1.2; and
      (2) about 0.3 to about 0.9 phr of a free radical initiator or a solution of a free radical initiator in a solvent that is miscible with said supercritical carbon dioxide; and
   (C) heating said mixture to a temperature of about 45 to about 65° C.

19. A method according to claim 18 wherein said free radical initiator is di-n-propyl peroxy dicarbonate or diethyl peroxydicarbonate.

20. A method according to claim 18 wherein said initiator is on a support of amorphous or fumed silica or alumina.

21. A method according to claim 1 wherein said carbon dioxide is recycled.

* * * * *